(12) United States Patent
Sugiura et al.

(10) Patent No.: US 6,220,019 B1
(45) Date of Patent: Apr. 24, 2001

(54) EXHAUST GAS PURIFYING APPARATUS FOR AN INTERNAL COMBUSTION ENGINE

(75) Inventors: Kenji Sugiura; Toshikatsu Takanohashi, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/408,563

(22) Filed: Sep. 30, 1999

(30) Foreign Application Priority Data

Sep. 30, 1998 (JP) .................................................. 10-276268

(51) Int. Cl.$^7$ ....................................................... F01N 3/00
(52) U.S. Cl. .................. 60/285; 60/284; 60/286
(58) Field of Search ............................... 60/284, 285, 286

(56) References Cited

U.S. PATENT DOCUMENTS 5,423,181 * 6/1995 Katoh et al. ............................ 60/285
5,845,492 * 12/1998 Isobe et al. ............................. 60/284
5,950,419 * 9/1999 Nishimura et al. .................... 60/284
5,974,794 * 11/1999 Gotoh et al. ........................... 60/286

FOREIGN PATENT DOCUMENTS 2692530    9/1997  (JP) .

* cited by examiner

*Primary Examiner*—Thomas Denion
*Assistant Examiner*—Tu M. Nguyen
(74) *Attorney, Agent, or Firm*—Sughrue, Mion, Zinn, Macpeak & Seas, PLLC

(57) ABSTRACT

If conditions of stopping an engine are satisfied, it is judged whether the lean operation in which the air-fuel ratio is set to be on a lean side with respect to the theoretical air-fuel ratio is currently performed or not. If the lean operation is currently performed, reduction enrichment of NOx is executed during an enrichment time TRICH, and the engine is thereafter actually stopped.

1 Claim, 6 Drawing Sheets

EXHAUST GAS PURIFYING APPARATUS FOR AN INTERNAL COMBUSTION ENGINE

BACKGROUND OF THE PRESENT INVENTION

1. Field of the Present Invention

The present invention relates to an exhaust gas purifying apparatus for an internal combustion engine in which a driving force is assisted by an electric motor, and particularly to an exhaust gas purifying apparatus for an internal combustion engine having an exhaust system which is provided with a nitrogen oxide (NOx) purifying apparatus containing an absorbent for NOx

2. Description of the Related Art

When the lean operation in which the air-fuel ratio of an air-fuel mixture which is to be supplied to an internal combustion engine is set to be on the lean side with respect to a theoretical air-fuel ratio is executed, the discharged amount of NOx tends to be increased. Conventionally, it has been known that a NOx absorbent that absorbs NOx is incorporated into an exhaust system of an engine so as to purify an exhaust gas. Such a NOx absorbent has properties that, in a state where the air-fuel ratio is set to be on the lean side with respect to a theoretical air-fuel ratio and the oxygen concentration in the exhaust gas is relatively high (NOx is rich) (hereinafter, referred to as "exhaust gas-lean state"), the absorbent absorbs Nox. Alternatively, in a state where the air-fuel ratio is set to be in the vicinity of the theoretical air-fuel ratio or on the rich side with respect to the theoretical air-fuel ratio, the oxygen concentration in the exhaust gas is relatively low (hereinafter, referred to as "exhaust gas-rich state"), the absorbent releases NOx which has been absorbed. A NOx purifying apparatus containing such a NOx absorbent is configured so that, in the exhaust gas-rich state, NOx released from the NOx absorbent is reduced by HC and CO and then discharged as a nitrogen gas, and HC and CO are oxidized and then discharged as water vapor and carbon dioxide.

The NOx absorbent has naturally a limit on the absorbable amount of Nox. Hence, it is impossible to continue only the lean operation for a long term. In the conventional art, therefore, an air-fuel ratio controlling technique is known in which the air-fuel ratio is temporarily enriched in order to release NOx from the NOx absorbent, NOx is then released from the NOx absorbent, and the released NOx is reduced (for example, Japanese Patent No. 2,692,530). Hereinafter, this temporary enrichment is referred to as "reduction enrichment".

In the technique disclosed in the Japanese patent, when an opened state of a throttle valve is to be transferred to a fully closed state, the air-fuel ratio is changed from a value on the lean side with respect to the theoretical air-fuel ratio to the theoretical air-fuel ratio. However, immediately after an engine is transferred to an idling state, reduction enrichment in which the ratio is set to a value on the rich side with respect to the theoretical air-fuel ratio is performed for a short time period. This is performed in order to, for a short time period, reduce NOx which has been absorbed in the NOx absorbent during the lean operation. When the fuel supply is stopped during deceleration of the engine, a control is performed for the same purpose in the following manner. Reduction enrichment is executed at timing when the fuel supply is restarted immediately after the stop of the fuel supply. Thereafter, the air-fuel ratio is transferred to the theoretical air-fuel ratio.

In a so-called hybrid vehicle having an internal combustion engine and an electric motor which assists the driving force of the internal combustion engine, the vehicle can be driven by a driving force exerted by the motor. Accordingly, when a throttle valve of the internal combustion engine is fully closed, a control is sometimes performed so as to stop the engine. In some cases, therefore, reduction enrichment cannot be executed immediately after the engine is transferred to an idling state as the above-described conventional art. In such cases, the NOx absorbing ability of the NOx absorbent may be lowered, so that the exhaust gas properties are impaired.

SUMMARY OF THE INVENTION

It is an object of the present invention to provide an exhaust gas purifying apparatus that can suitably execute reduction enrichment in an air-fuel ratio control of an internal combustion engine in which a driving force is assisted by an electric motor and which has a NOx purifying apparatus, and maintain the NOx absorbing ability of the NOx purifying apparatus, whereby excellent exhaust gas properties can be obtained.

According to the present invention, an exhaust gas purifying apparatus for an internal combustion engine, which is disposed in an exhaustion system of an internal combustion engine in which a driving force is assisted by an electric motor, comprises: nitrogen oxide purifying means for absorbing a nitrogen oxide in an exhaust gas in an exhaust gas-lean state in which an oxygen concentration of the exhaust gas is relatively high, and for reducing the absorbed nitrogen oxide in an exhaust gas-rich state in which the oxygen concentration of the exhaust gas is relatively low; reducing means for controlling an air-fuel ratio of an air-fuel mixture to be supplied to the engine, so as to make the exhaust gas the exhaust gas-rich state; engine stopping means for, provided that at least a throttle valve of the engine is substantially fully closed, stopping the engine; and controlling means for, when the air-fuel ratio of the air-fuel mixture is set to be on a lean side with respect to a theoretical air-fuel ratio immediately before a stop of the engine, activating the reducing means immediately before the stop of the engine or immediately after restart of the engine after the stop.

According to this configuration, the engine is stopped provided that at least the throttle valve of the engine is substantially fully closed. When the air-fuel ratio of the air-fuel mixture to be supplied to the engine is set to be on a lean side with respect to the theoretical air-fuel ratio immediately before the stop of the engine, the air-fuel ratio is changed toward an enriching direction by the reducing means immediately before the stop of the engine or immediately after restart of the engine after the stop. As a result, a nitrogen oxide which has been absorbed by the nitrogen oxide purifying means during the lean operation is reduced. Further, the nitrogen oxide absorbing ability of the nitrogen oxide purifying means is maintained, so that excellent exhaust gas properties can be obtained.

PREFERRED EMBODIMENT OF THE PRESENT INVENTION

Hereinafter, embodiments of the present invention will be described with reference to the accompanying drawings.

First Embodiment

Figure 1:
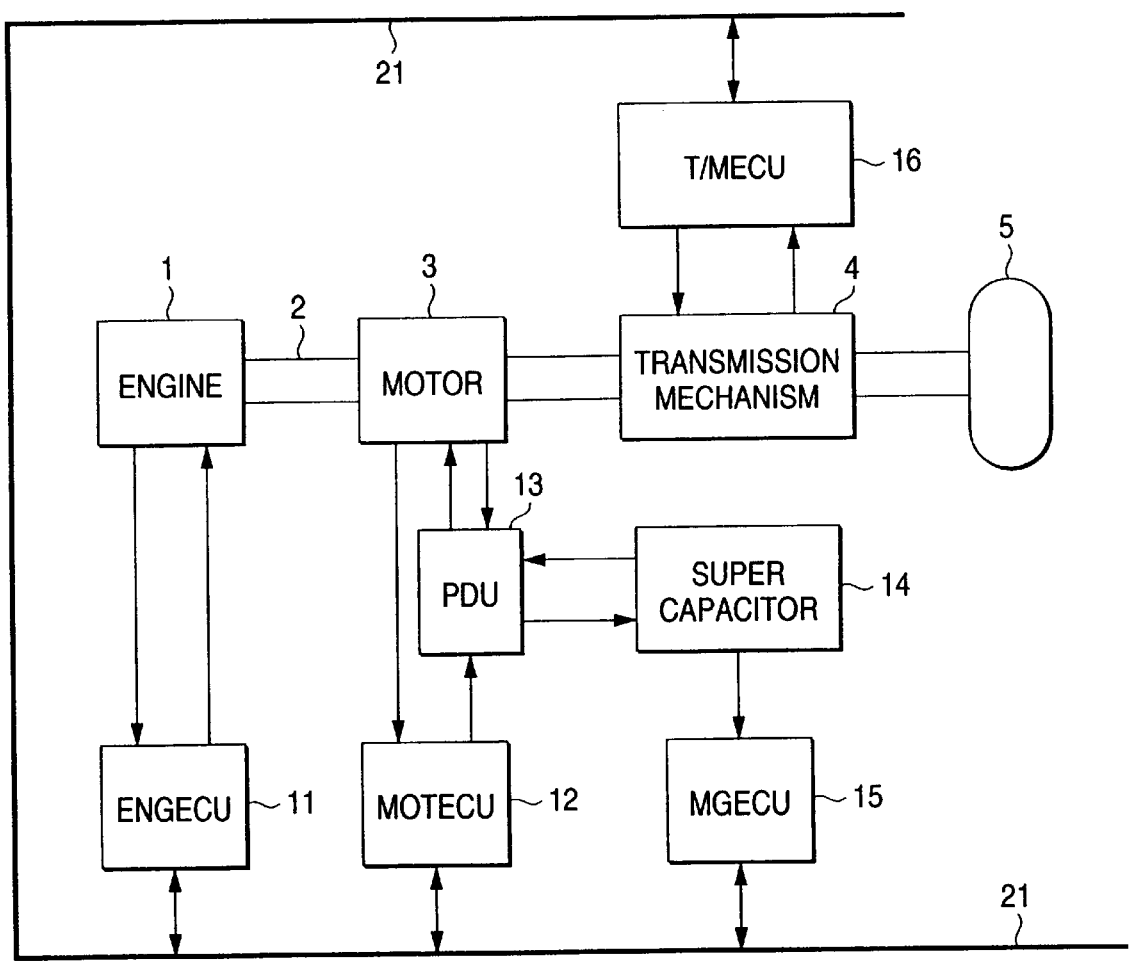
FIG. 1 is a diagram showing the configuration of a driving system of a hybrid vehicle having an exhaust gas purifying apparatus of an embodiment of the present invention, and a control device for the system.

FIG. 1 is a diagram schematically showing the configuration of a driving system of a hybrid vehicle comprising an exhaust gas purifying apparatus of an embodiment of the present invention, and a control device for the system (in the figure, components such as sensors and actuators are omitted). A driving shaft 2 which is driven by an internal combustion engine (hereinafter, referred to as "engine") 1 is configured so as to drive a driving wheel 5 via a transmission mechanism 4. An electric motor 3 is disposed so as to directly rotate the driving shaft 2. The electric motor 3 has a regenerative function which converts the kinetic energy due to rotation of the driving shaft 2 into an electric energy and outputs the electric energy. The motor 3 is connected to a super capacitor (an electric double layer capacitor having a large electrostatic capacity) 14 via a power drive unit (hereinafter, abbreviated as "PDU") 13. The driving and regenerative operations are controlled via the PDU 13.

An engine electronic control unit (hereinafter, abbreviated as "ENGECU") 11 which controls the engine 1, a motor electronic control unit (hereinafter, abbreviated as "MOTECU") 12 which controls the motor 3, a management electronic control unit (hereinafter, abbreviated as "MGECU") 15 which performs energy management due to judgment on the state of the super capacitor 14, and a transmission mechanism electronic control unit (hereinafter, abbreviated as "T/MECU") 16 which controls the transmission mechanism 4 are disposed. These ECUs (Electronic Control Units) are connected to one another via a data bus 21. The ECUs transmits information such as detection data and flags to one another. The ENGECU 11 controls the engine 1, or performs controls on the fuel supply and the ignition timing in accordance with the operation condition of the engine. The MOTECU 12 controls the operation mode of the motor 3 in accordance with the operation condition of the vehicle, so as to perform assistance of the driving force of the engine 1 by means of the motor 3, or regeneration which converts the kinetic energy of the vehicle into an electric energy. The MGECU 15 performs mainly processes of monitoring the residual capacity of the super capacitor 14, and informing the MOTECU 12 of the capacity. The T/MECU 16 controls the transmission mechanism 4 in accordance with the operation condition of the vehicle and the operation mode of the motor 3.

Figure 2:
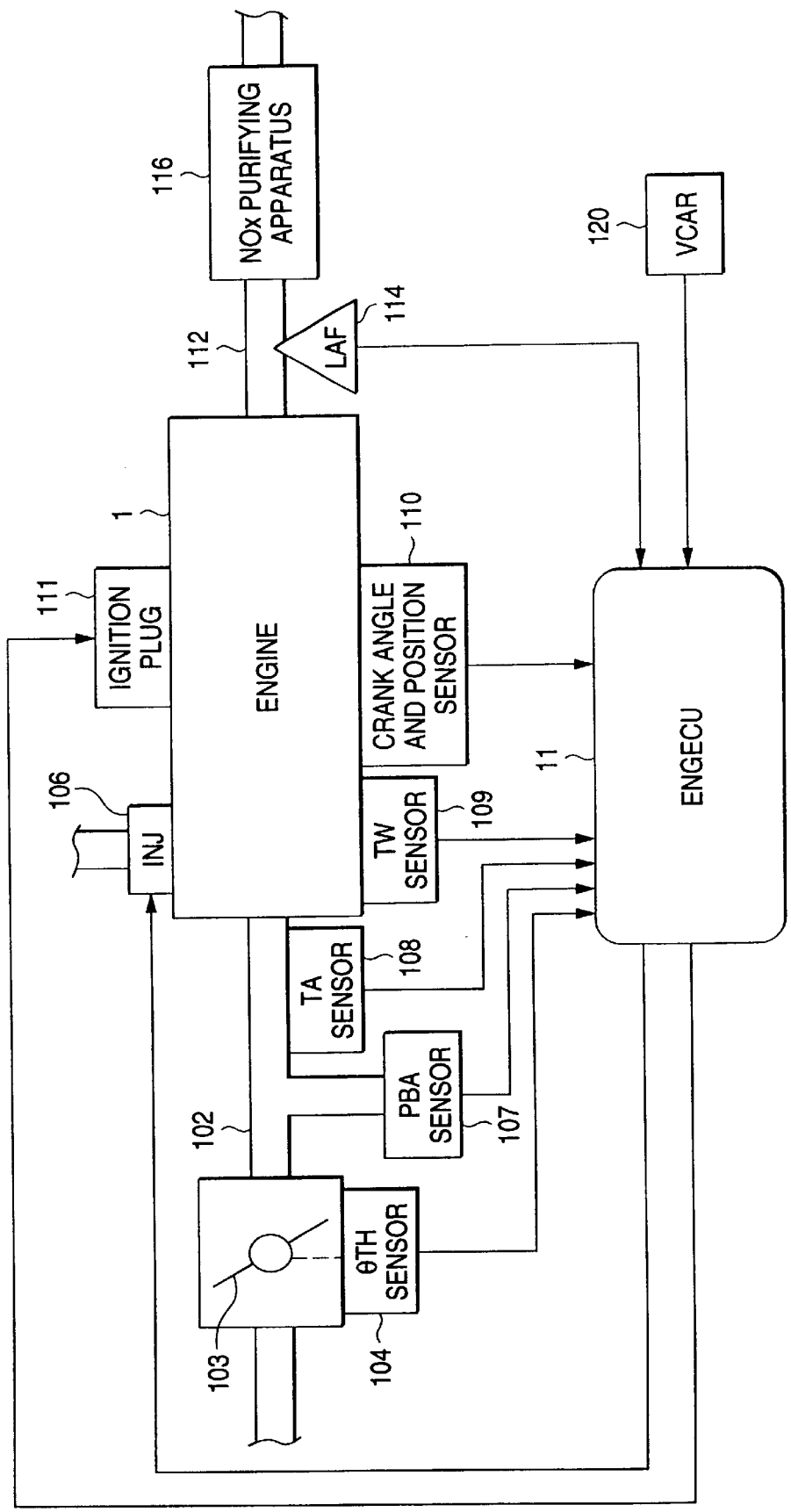
FIG. 2 is a diagram showing the configuration of an electronic control unit for controlling an engine, and its peripheral apparatuses.

FIG. 2 is a diagram showing the configuration of the engine 1, the ENGECU 11, and their peripheral apparatuses. A throttle valve 103 is disposed in the midway of a suction pipe 102 of the engine 1 which has, for example, four cylinders. A throttle valve opening (ΘTH) sensor 104 is coupled to the throttle valve 103, so as to output an electric signal corresponding to the opening of the throttle valve 103. The signal is supplied to the ENGECU 11.

A fuel injection valve 106 is disposed for each cylinder, so as to directly inject the fuel into the combustion chamber of the corresponding cylinder. Each injection valve is connected to a fuel pump which is not shown, and electrically connected to the ENGECU 11, so that the opening timing and time of the fuel injection valve 106 is controlled by a signal from the ENGECU 11. An ignition plug 111 of each cylinder of the engine 1 is connected to the ENGECU 11, and the ignition timing is controlled by the ENGECU 11.

A suction pipe absolute pressure (PBA) sensor 107 is disposed immediately downstream from the throttle valve 103. An absolute pressure signal which is converted into an electric signal by the absolute pressure sensor 107 is supplied to the ENGECU 11. A suction air temperature (TA) sensor 108 is attached downstream of the absolute pressure sensor, so as to detect the suction air temperature TA and output an electric signal corresponding to the temperature. The signal is supplied to the ENGECU 11.

An engine water temperature (TW) sensor 109 mounted on the body of the engine 1 consists of a thermister or the like, so as to detect the engine water temperature (cooling water temperature) TW and output a temperature signal corresponding to the temperature. The signal is supplied to the ENGECU 11.

A crank angle and position sensor 110 which detects the rotation angle of a crankshaft (not shown) of the engine 1 is connected to the ENGECU 11. A signal corresponding to the rotation angle of the crankshaft is supplied to the ENGECU 11. The crank angle and position sensor 110 consists of a cylinder judgement sensor, a TDC sensor and a CRK sensor. The cylinder judgment sensor outputs a signal pulse (hereinafter, referred to as "CYL signal pulse") at a predetermined crank angle position in a specific one of the cylinders of the engine 1. The TDC sensor outputs a TDC signal pulse at a crank angle position (in a four-cylinder engine, for each crank angle of 180 deg.) which leads by a predetermined crank angle the top dead center (TDC) at the start of the suction stroke of each cylinder. The CRK sensor which generates one pulse (hereinafter, referred to as "CRK signal pulse") at a constant crank angle period (for example, a period of 30 deg.) that is shorter than the TDC signal pulse. The CYL signal pulse, the TDC signal pulse, and the CRK signal pulse are supplied to the ENGECU 11. These signal pulses are used in controls of various timings such as the timing of fuel injection and the ignition timing, and detection of the engine revolution number NE.

A NOx purifying apparatus 116 serving as nitrogen oxide purifying means is disposed in an exhaust pipe 112.

The NOx purifying apparatus 116 contains a NOx absorbent which absorbs NOx, and a catalyst which promotes oxidation and reduction. As the NOx absorbing agent, useful is: an absorption agent having properties that, in the exhaust gas-lean state where the air-fuel ratio of the air-fuel mixture to be supplied to the engine 1 is set to be on the lean side with respect to the theoretical air-fuel ratio and the oxygen concentration in the exhaust gas is relatively high (NOx is rich), the agent absorbs NOx, and, in the exhaust gas-rich state where the air-fuel ratio of the air-fuel mixture supplied to the engine 1 is set to be in the vicinity of the theoretical air-fuel ratio or on the lean side with respect to the theoretical air-fuel ratio and the oxygen concentration in the exhaust gas is relatively low, the agent releases absorbed NOx; or an adsorption agent which, in the exhaust gas-lean state, adsorbs NOx, and, in the exhaust gas-rich state, reduces NOx. The NOx purifying apparatus 116 is configured so that, in the exhaust gas-lean state, the NOx absorbing agent absorbs NOx, and, in the exhaust gas-rich state, NOx which has been absorbed by the NOx absorbing agent is reduced by HC and CO to be discharged as a nitrogen gas, and HC and CO are oxidized to be discharged as water vapor and carbon dioxide. For example, barium oxide (BaO) is used as the NOx absorbing agent of the occlusion type, and sodium (Na) and titanium (Ti), or strontium (Sr) and titanium (Ti) are used as the NOx absorbing agent of the adsorption type. In both the cases of the occlusion type and the adsorption type, for example, platinum (Pt) is used as the catalyst. Usually, the NOx absorbing agent has a property that absorbed NOx is released more easily as the temperature is higher.

When the NOx absorbing agent absorbs NOx to the limit of the NOx absorbing ability, i.e., the maximum absorbable amount of NOx, the NOx absorbing agent cannot further absorb NOx. In order to release NOx at appropriate times so as to be reduced, therefore, enrichment of the air-fuel ratio, i.e., reduction enrichment is executed.

A proportional air-fuel ratio sensor 114 (hereinafter, referred to as "LAF sensor 114") is placed in a position upstream from the NOx purifying apparatus 116. The LAF sensor 114 outputs an electric signal which is substantially proportional to the oxygen concentration (the air-fuel ratio) in the exhaust gas, and supplies the signal to the ENGECU 11.

Furthermore, a vehicle speed sensor 120 which detects the running speed VCAR of the vehicle is connected to the ENGECU 11. The detection signal of the sensor is supplied to the ENGECU 11.

The ENGECU 11 contains an input circuit, a central processing unit, a storing unit, output circuit and the like. The input circuit has functions such as those of shaping the waveform of each of signals supplied from various sensors, correcting the voltage level to a predetermined level, and converting an analog signal value into a digital signal value. The storing unit stores various calculations programs which are to be executed in the CPU, results of the calculation, and the like. The output circuit supplies a drive signal to the fuel injection valves 106. The other ECUs 12, 15, and 16 shown in FIG. 1 are configured in the same manner as the ENGECU 11.

On the basis of the above-mentioned engine parameter signals, the CPU of the ENGECU 11 judges various engine operation conditions. In accordance with the judged engine operation condition, the CPU calculates the fuel injection time TOUT of each fuel injection valve 106 synchronized with the TDC signal pulse, according to expression (1) below.

$$TOUT = TI \times KCMD \times KLAF \times K1 + K2 \quad (1)$$

In the expression, TI is a basic fuel injection time of the fuel injection valve 106, and determined by searching a preset TI map in accordance with the engine revolution number NE and the suction pipe absolute pressure PBA. The TI map is set so that the air-fuel ratio of the air-fuel mixture which is to be supplied to the engine is substantially equal to the theoretical air-fuel ratio, under the operation condition corresponding to the engine revolution number NE and the suction pipe absolute pressure PBA.

Figure 3:
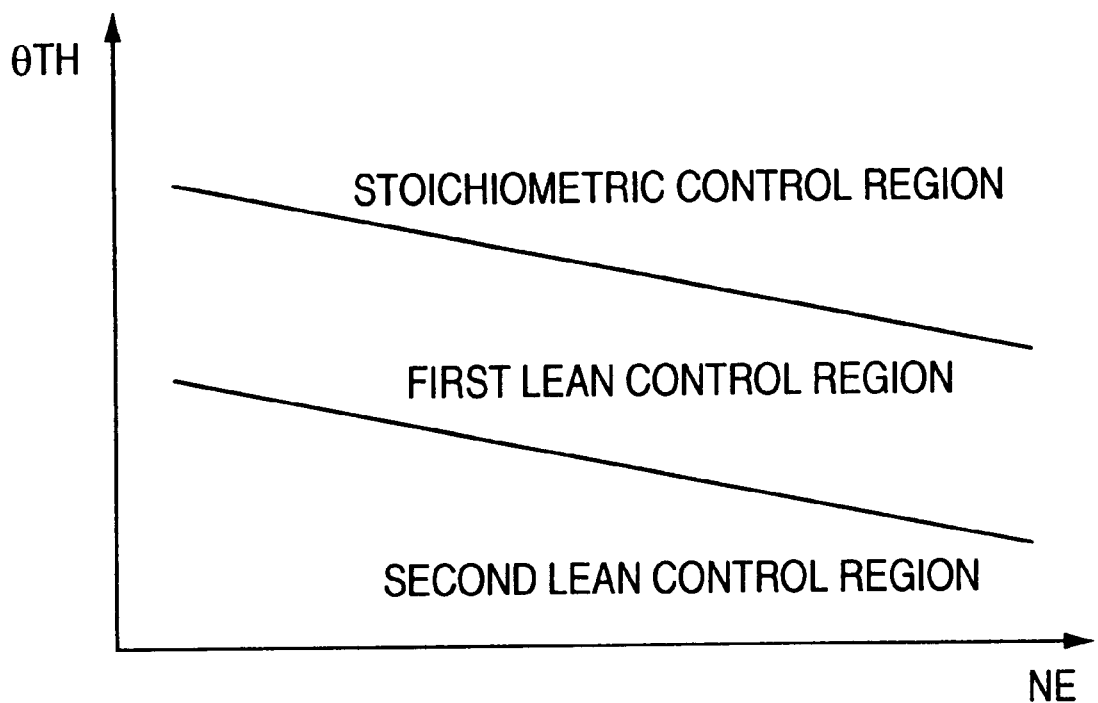
FIG. 3 is a diagram showing operation regions of the engine which are determined in accordance with the engine revolution number and the throttle valve opening.

KCMD is a target air-fuel ratio coefficient, and is set in accordance with engine operation parameters such as the engine revolution number NE, the throttle valve opening ΘTH, and the engine water temperature TW. The target air-fuel ratio coefficient KCMD is proportional to the reciprocal of the air-fuel ratio A/F, or the fuel-air ratio F/A, and, at the theoretical air-fuel ratio, has a value of 1.0. Therefore, the target air-fuel ratio coefficient is called also the target equivalence ratio. Specifically, in accordance with the engine revolution number NE and the throttle valve opening ΘTH, a stoichiometric control region, a first lean control region, and a second lean control region which are shown in FIG. 3 are determined. In an engine operation condition in which the engine revolution number NE and the throttle valve opening ΘTH are in the stoichiometric control region, the target air-fuel ratio coefficient KCMD is set to about "1.0." In a restricted operation condition such as a high-load operation condition in which the throttle valve is fully opened, the coefficient is set to a value which is larger than 1.0. In an engine operation condition in which the engine revolution number NE and the throttle valve opening ΘTH are in the first lean control region, for example, the target air-fuel ratio coefficient KCMD is set to about 0.67 to 0.8 (a value corresponding to an air-fuel ratio of 18 to 22), and, in an engine operation condition in which the number and the opening are in the second lean control region, for example, the target air-fuel ratio coefficient is set to about 0.3 to 0.5 (a value corresponding to an air-fuel ratio of 30 to 50).

When reduction enrichment is to be executed, the target air-fuel ratio coefficient KCMD is temporarily set to, for example, about 1.05 (a value corresponding to an air-fuel ratio of 14).

KLAF is an air-fuel ratio correction coefficient which is calculated by a PID control so that, when conditions of execution of a feedback control are satisfied, a detection equivalence ratio KACT which is calculated from the detection value of the LAF sensor 114 coincides with the target equivalence ratio KCMD.

K1 and K2 are another correction coefficient and a correction variable which are calculated in accordance with the various engine parameter signals, respectively, and determined to predetermined values at which various properties including the fuel consumption property and the engine acceleration property that correspond to the engine operation condition can be optimized.

The CPU of the ENGECU 11 further determines the opening timing (fuel injection timing) of each fuel injection valve 106 in accordance with the engine operation condition. Specifically, in accordance with the engine revolution number NE and the throttle valve opening ΘTH, the timing is determined so that, in the stoichiometric control region and the first lean control region shown in FIG. 3, injection is conducted in the suction stroke of each cylinder. Alternatively, in the second lean control region, injection is conducted in the compression stroke of each cylinder. The CPU of the ENGECU 11 further determines the ignition timing ΘIG of each ignition plug 111 in accordance with the engine revolution number NE, the suction pipe absolute pressure PBA, etc.

On the basis of the fuel injection time TOUT, the fuel injection timing and the ignition timing ΘIG which are obtained as described above, the ENGECU 11 supplies signals for driving the fuel injection valves 106 and the ignition plugs 111 to the fuel injection valves 106 and the ignition plugs 111.

Figure 4:
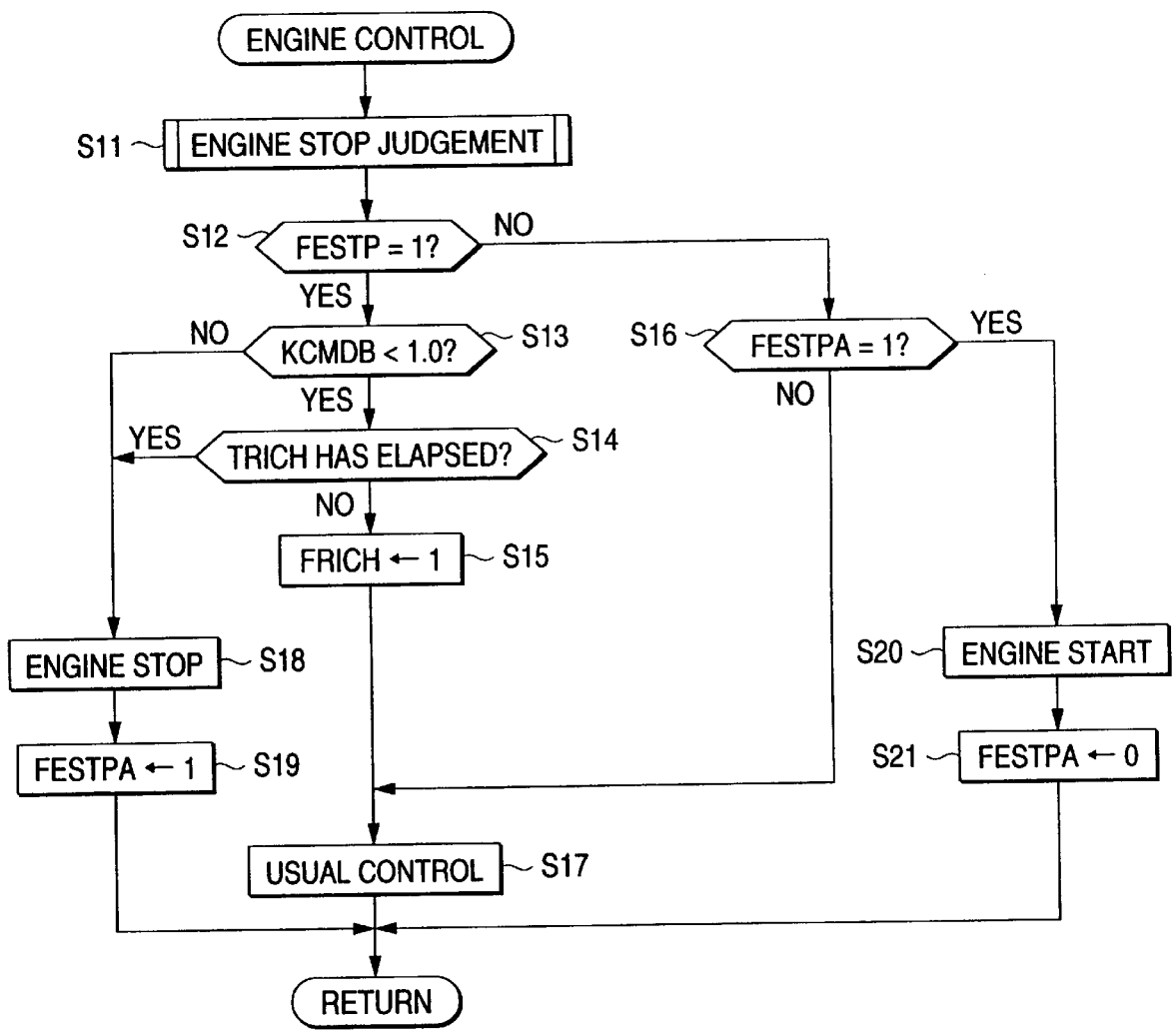
FIG. 4 is a flowchart of a process of controlling the engine.

FIG. 4 shows a flowchart of an engine control process which is executed by the CPU of the ENGECU 11. This process is executed at intervals of a constant time period.

In step S11, an engine stop judging process is executed to judge whether the operation conditions in which the engine 1 is to be stopped are produced or not, or whether conditions of stopping the engine 1 are satisfied or not. If it is judged that the operation conditions in which the engine 1 is to be stopped are produced, a stop judgment flag FESTP is set to "1". In the embodiment, the operation conditions in which the engine 1 is to be stopped are set to conditions where the throttle valve 103 is substantially fully closed and the engine revolution number NE is not larger than a predetermined revolution number NA (for example, 1,000 rpm), or the engine 1 is in the idling state.

In next step S12, it is judged whether the stop judgment flag FESTP is "1" or not. If FESTP=0 or the conditions of stopping the engine 1 are not satisfied, it is judged whether a stop flag FESTPA is "1" or not (step S16). When the engine 1 is actually stopped, the stop flag is set to "1." If FESTPA=0 or the engine 1 is operating, the control advances to step S17 in order to execute usual engine controls, i.e., controls on the fuel supply to the engine 1 and the ignition timing. If FESTPA=1, the stopped engine is started (step S20), and the stop flag FESTPA is set to "0" (step S21). Thereafter, this process is ended.

Figure 5:
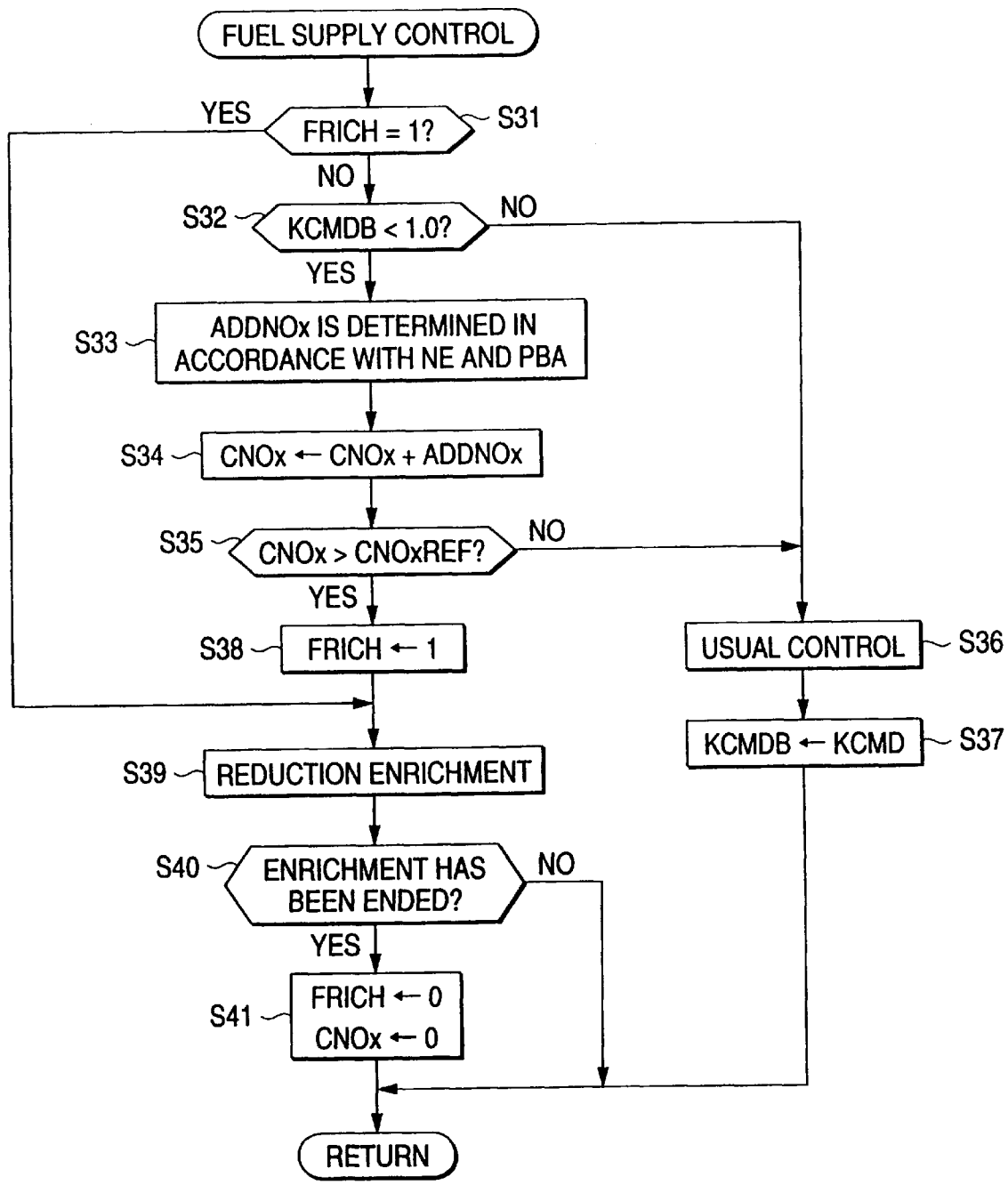
FIG. 5 is a flowchart of a process of controlling the fuel supply to the engine.

If it is judged in step S12 that FESTP=1 or the conditions of stopping the engine 1 are satisfied, it is judged whether a stored value KCMDB of the target equivalence ratio is smaller than "1.0" or not, or whether the lean operation is being performed or not (step S13). As shown in FIG. 5 which will be described later, the stored value KCMDB is a stored value of the latest target equivalence ratio KCMD, and, during execution of reduction enrichment, is a stored value of the target equivalence ratio KCMD which is obtained immediately before start of the reduction enrichment. In other words, when the stored value KCMDB is referred, it is possible to judge whether the lean operation in which the air-fuel ratio is set to be on a lean side with respect to the theoretical air-fuel ratio is currently performed or the stoichiometric/rich operation in which the air-fuel ratio is set to the theoretical air-fuel ratio or to be on a rich side with respect to the theoretical air-fuel ratio is currently performed.

If it is judged in step S13 that KCMDB≧1.0 or the stoichiometric/rich operation is being performed, the engine 1 is immediately stopped (step S18), and the stop flag FESTPA is set to "1" (step S19). Thereafter, this process is ended. Specifically, the engine 1 is stopped by interrupting the fuel supply to the engine 1 and the supply of the driving signal to the ignition plugs 111.

If it is judged in step S13 that KCMDB<1.0 or the lean operation is being performed, it is judged in step S14 whether an enrichment time TRICH has elapsed after the timing when the stop flag FESTPA is set to "1" or not. At the initial time, this judgment results in negative (NO), and hence an enrichment flag FRICH is set to "1" (step S15) and the control advances to step S17. If the enrichment time TRICH has then elapsed, the control advances to step S18 to stop the engine 1. The enrichment time TRICH is set to a time period (for example, about 1 or 2 seconds) when, under a state where the NOx absorbent of the NOx purifying apparatus 116 absorbs NOx to its limit, the whole amount of the absorbed NOx can be reduced.

As described above, in the embodiment, when the engine 1 is to be stopped during the lean operation, reduction enrichment is executed during the enrichment time TRICH, and the engine 1 is then stopped. Therefore, the sufficient NOx absorbing ability of the NOx purifying apparatus 116 can be maintained. Further, even immediately after the engine 1 is restarted, it is possible to surely prevent NOx from being released.

FIG. 5 is a flowchart of a process which is executed in step S17 of FIG. 4 and which controls the fuel supply to the engine 1. Also this process is executed by the CPU of the ENGECU 11 at intervals of a constant time period.

In step S31, it is judged whether the enrichment flag FRICH is "1" or not. If FRICH=0, it is judged whether the lean operation is being performed or not, or whether the stored value KCMDB of the target air-fuel ratio coefficient KCMD which is stored in step S37 (that will be described later) and during a usual control wherein reduction enrichment is not executed is smaller than "1.0" or not (step S32). If it is judged that KCMDB≧1.0 or the lean operation is not being performed, the control immediately advances to step S36 in which the target air-fuel ratio coefficient KCMD and the like are set in accordance with the engine operation conditions and a usual fuel supply control using Expression (1) above is performed. Thereafter, the target air-fuel ratio coefficient KCMD is stored as the stored value KCMDB (step S37), and the process is then ended.

If it is judged in step S32 that KCMDB <1.0 or the lean operation is being performed, an increment ADDNOX which is to be used in next step S34 is determined in accordance with the engine revolution number NE and the suction pipe absolute pressure PBA (step S33). The increment ADDNOx is a parameter corresponding to the amount of NOx which is discharged per unit time period during the lean operation. The increment is set so as to be larger as the engine revolution number NE is larger and the suction pipe absolute pressure PBA is higher.

In step S34, the increment ADDNOx which is determined in step S33 is applied to the following expression to increment a NOx amount counter CNOx. As a result, a count value corresponding to the discharged amount of NOx is obtained.

$$CNOx = CNOx + ADDNOx$$

In next step S35, it is judged whether the value of the NOx amount counter CNOx exceeds an allowable value CNOx REF or not. If this judgment results in negative (NO), the control advances to step S36 described above to perform the usual fuel supply control. The allowable value CNOxREF is set to a value corresponding to the amount of NOx which is slightly smaller than the maximum absorbable amount of NOx of the NOx absorbing agent.

If it is judged in step S35 that CNOx>CNOxREF, the enrichment flag FRICH is set to "1" (step S38), and reduction enrichment in which the target air-fuel ratio coefficient KCMD is set to a value corresponding to an air-fuel ratio of about 14.0 is executed (step S39). This reduction enrichment is executed during the enrichment time TRICH (for example, about 1 or 2 seconds).

In step S40, it is judged whether reduction enrichment has been ended or not. If reduction enrichment has not been ended, this process is immediately ended. If reduction enrichment has been ended, the count value of the NOx amount counter CNOx is reset to "0" and the enrichment flag FRICH is reset to "0" (step S41). When the enrichment flag FRICH is once set to "1" in step S38 or the above-described process of FIG. 4, the processes of steps S31, S39, and S40 are repeatedly executed until reduction enrichment is ended (the enrichment time TRICH elapses). If reduction enrichment is ended, the control advances from step S35 to step S36.

In the process of FIG. 5, during the lean operation, reduction enrichment is executed each time when the value of the NOx amount counter CNOx reaches the allowable value CNOxREF, or when, in the process of FIG. 4, the stop judgment flag FESTP is set to "1" and the enrichment flag FRICH is set to"1." As a result, NOx absorbed by the NOx absorbing agent is reduced.

As described above, in the embodiment, when the conditions of stopping the engine 1 are satisfied during the lean operation, reduction enrichment is executed during the enrichment time TRICH, and the engine 1 is then stopped. Therefore, NOx which has been absorbed by the NOx purifying apparatus 116 during the lean operation is reduced, and the NOx absorbing ability of the NOx purifying apparatus 116 is maintained, with the result that excellent exhaust gas properties can be obtained.

In the embodiment, step S39 of FIG. 5 corresponds to the reducing unit, steps S11, S12, and S18 of FIG. 4 correspond to the engine stopping unit, and steps S13, S14, and S15 of FIG. 4 and step S31 of FIG. 5 correspond to the controlling unit.

Second Embodiment

Figure 6:
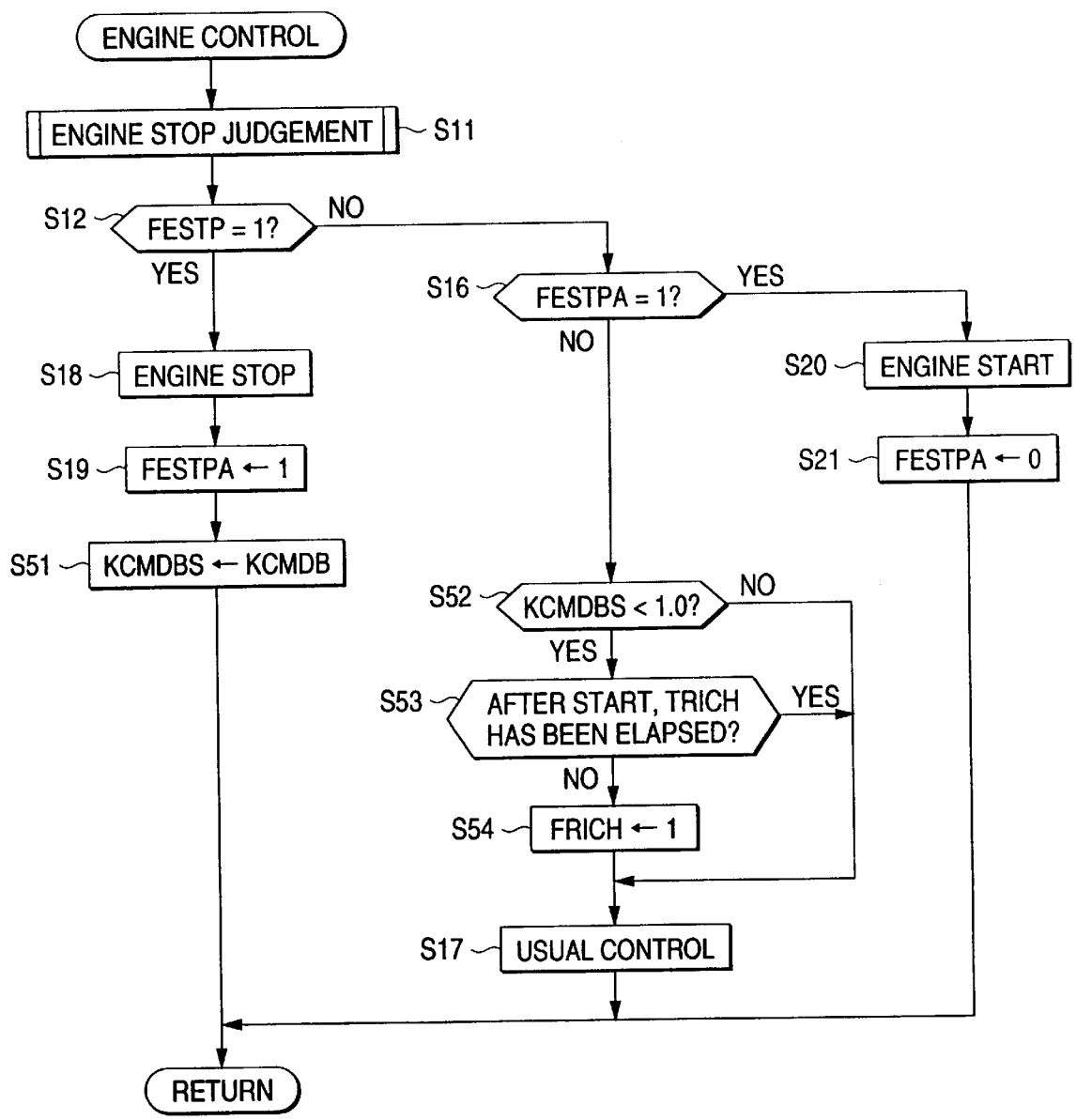
FIG. 6 is a flowchart of a process of controlling the engine in a second embodiment of the present invention.

In this embodiment, an engine control process shown in FIG. 6 is executed in place of the process of FIG. 4, so that, when engine stop conditions are satisfied, the engine 1 is immediately stopped, and reduction enrichment is executed immediately after restart.

In FIG. 6, the same processes as those of FIG. 4 are designated by the same step numbers. Namely, in step S11, the engine stop judging process is executed, and, in step S12, it is judged whether the stop judgment flag FESTP is "1" or not. If FESTP=1, the engine 1 is stopped (step S18), the stop flag FESTPA is set to "1" (step S19), and the stored value KCMDB of the target air-fuel ratio coefficient KCMD at this time is stored as a before-stop value KCMDBS (step S51).

If it is judged in step S12 that FESTP=0, it is judged whether the stop flag FESTPA is "1" or not (step S16). If FESTPA=1, the engine 1 is restarted (step S20), and the stop flag FESTPA is reset to "0" (step S21). Thereafter, this process is ended. If it is judged in step S16 that FESTPA=0, it is judged whether the before-stop value KCMDBS is smaller than "1.0" or not, or whether the engine 1 is stopped during the lean operation or not (step S52). If KCMDBS≧1.0 or the engine 1 is stopped during the stoichiometric/rich operation, the control immediately advances to step S17. If KCMDBS<1.0 or the engine 1 is stopped during the lean operation, it is judged whether the enrichment time TRICH has elapsed after restart or not (step S53). At the initial time, this judgment results in negative (NO), and hence the enrichment flag FRICH is set to "1" (step S54) and the control advances to step S17. If the enrichment time TRICH has elapsed after restart, the control advances from step S53 to step S17.

The embodiment is configured in the same manner except the configuration described above.

In the embodiment, when the engine 1 is stopped during the lean operation, reduction enrichment is executed immediately after restart. Therefore, the sufficient NOx absorbing ability of the NOx purifying apparatus 116 can be maintained, and, even immediately after the engine 1 is restarted, it is possible to surely prevent NOx from being released.

In the embodiment, step S39 of FIG. 5 corresponds to the reducing unit, steps S11, S12, and S18 of FIG. 6 correspond to the engine stopping unit, and steps S52, S53, and S54 of FIG. 6 and step S31 of FIG. 5 correspond to the controlling unit.

The present invention is not restricted to the embodiments described above, and may be variously modified. For example, although the time TRICH of executing reduction enrichment immediately before the engine is stopped or immediately after the engine is restarted is set to be constant, the time period may be set to be longer in accordance with the value of the NOx amount counter CNOx at the timing of the engine stop, or as the CNOx value is larger.

The injection valve 106 may be disposed so as to inject the fuel into the suction pipe 102.

As described above in detail, according to the present invention, an engine is stopped provided that at least the throttle valve of the engine is substantially fully closed. When the air-fuel ratio of the air-fuel mixture to be supplied to the engine is set to be on a lean side with respect to the theoretical air-fuel ratio immediately before the stop of the engine, the air-fuel ratio is changed toward an enriching direction by the reducing means immediately before the stop of the engine or immediately after restart of the engine after the stop. As a result, a nitrogen oxide which has been absorbed by the nitrogen oxide purifying means during the lean operation is reduced, and the nitrogen oxide absorbing ability of the nitrogen oxide purifying means is maintained, so that excellent exhaust gas properties can be obtained.

What is claimed is:

1. An exhaust gas purifying apparatus for an internal combustion engine, which is disposed in an exhaustion system of an internal combustion engine in which a driving force is assisted by an electric motor, comprising:

nitrogen oxide purifying means for absorbing a nitrogen oxide in an exhaust gas in an exhaust gas-lean state in which an oxygen concentration of the exhaust gas is relatively high, and for reducing the absorbed nitrogen oxide in an exhaust gas-rich state in which the oxygen concentration of the exhaust gas is relatively low;

reducing means for controlling an air-fuel ratio of an air-fuel mixture to be supplied to the engine, so as to make the exhaust gas be in the exhaust gas-rich state;

engine stopping means for, provided that at least a throttle valve of the engine is substantially fully closed, stopping the engine; and controlling means for, when the air-fuel ratio of the air-fuel mixture is set to be on a lean side with respect to a theoretical air-fuel ratio immediately before a stop of the engine, activating said reducing means to reduce the absorbed nitrogen oxide in the exhaust gas-rich state immediately upon restart of said engine after the engine is stopped.

* * * * *